(12) United States Patent
Blanchard et al.

(10) Patent No.: US 7,742,938 B2
(45) Date of Patent: *Jun. 22, 2010

(54) SYSTEM AND METHOD FOR EVALUATING MAINTENANCE COSTS OF PRODUCTS

(75) Inventors: Jean Louis Blanchard, Quincy sous Senart (FR); Christelle Pavillon, Paris (FR); Stephane Lorin, Paris (FR); Hammou Messatfa, Levallois Perret (FR)

(73) Assignee: International Business Machines Corporation, Armonk, NY (US)

( * ) Notice: Subject to any disclaimer, the term of this patent is extended or adjusted under 35 U.S.C. 154(b) by 1341 days.

This patent is subject to a terminal disclaimer.

(21) Appl. No.: 10/229,542

(22) Filed: Aug. 28, 2002

(65) Prior Publication Data

US 2003/0055766 A1    Mar. 20, 2003

(30) Foreign Application Priority Data

Aug. 30, 2001  (EP)  .................... 1480081

(51) Int. Cl.
*G06F 17/50*  (2006.01)
(52) U.S. Cl. .................. 705/7; 705/20; 705/28; 705/29; 705/35; 705/400
(58) Field of Classification Search ............... 705/705, 705/7, 28, 29, 1, 35, 400
See application file for complete search history.

(56) References Cited

U.S. PATENT DOCUMENTS

| | | | | |
|---|---|---|---|---|
| 3,617,716 A | * | 11/1971 | Schulz ................... 708/290 |
| 4,736,294 A | * | 4/1988 | Gill et al. .................. 705/38 |
| 5,504,674 A | * | 4/1996 | Chen et al. ................ 705/4 |
| 5,710,915 A | * | 1/1998 | McElhiney ................ 707/3 |
| 6,433,872 B1 | * | 8/2002 | Nishi et al. ............. 356/400 |
| 6,438,270 B1 | * | 8/2002 | Harrington ............. 382/262 |
| 6,502,080 B1 | * | 12/2002 | Eichorst et al. .......... 705/400 |
| 6,611,816 B2 | * | 8/2003 | Lebda et al. .............. 705/38 |
| 6,643,608 B1 | * | 11/2003 | Hershey et al. .......... 702/181 |
| 6,785,805 B1 | * | 8/2004 | House et al. ............... 713/1 |
| 6,842,753 B2 | * | 1/2005 | Chaudhuri et al. ........ 707/10 |
| 7,003,487 B1 | * | 2/2006 | Skirpa .................... 705/37 |
| 2001/0032109 A1 | * | 10/2001 | Gonyea et al. ............. 705/8 |
| 2002/0069216 A1 | * | 6/2002 | Bates ..................... 707/500 |

(Continued)

OTHER PUBLICATIONS

Normalization, Wikipedia, 1 page.*

(Continued)

*Primary Examiner*—Stefanos Karmis
(74) *Attorney, Agent, or Firm*—Fulbright & Jaworski LLP

(57) ABSTRACT

A method and system to evaluate the maintenance costs of products, having learning and application phases. Each phase is divided into two steps. The first analyzes product characteristics. The second is based on maintenance agreement conditions. During the first step of the learning phase, a first maintenance cost is estimated over the domain of a first variable representing product characteristics. Correction coefficients, based on other product characteristics, may be estimated to improve the first maintenance cost estimation. During the second step new correction coefficients are estimated according to maintenance agreement conditions. During the application phase, a first maintenance cost estimation is done according to the modality of the first variable, and adjusted depending on other product characteristics and maintenance agreement conditions.

16 Claims, 5 Drawing Sheets

U.S. PATENT DOCUMENTS

| | | | |
|---|---|---|---|
| 2002/0107780 A1* | 8/2002 | Suzuki et al. | 705/37 |
| 2002/0107789 A1* | 8/2002 | Wood | 705/38 |
| 2003/0105728 A1* | 6/2003 | Yano et al. | 705/400 |
| 2006/0085325 A1* | 4/2006 | Jammal et al. | 705/38 |
| 2007/0265907 A1* | 11/2007 | Adducci et al. | 705/10 |

OTHER PUBLICATIONS

Normalization, QSAR World, 1 page.*

Regression Analysis, Wikipedia, 7 pages.* http://www.statsoft.com/textbook/glosr.html; 11 pages.*

Extrapolation, Wikipedia, 3 pages.*

Bilinear Interpolation; http://en.wikipedia.org/wiki/Bilinear_interpolation.*

Blanchard, J. et al. "System and Method for Evaluating Residual Values of Products", IBM Patent Application, File Date to be assigned. Serial Number not available.

* cited by examiner

| Vehicle ID | Mileage (miles) | Duration (years) | Brand | Model | H.P. | ... | Cost ($) | Cost (cents/mile) |
|---|---|---|---|---|---|---|---|---|
| 85 203 | 20,428 | 3.21 | Citroën | Xantia | 110 | ... | 471.47 | 2.308 |
| 13 425 | 25,312 | 1.73 | BMW | 525i | 192 | ... | 828.46 | 3.273 |
| 37 263 | 35,379 | 2.14 | Audi | A4 | 125 | ... | 973.27 | 2.751 |
| 48 912 | 18,108 | 2.27 | Renault | Clio | 58 | ... | 348.76 | 1.926 |

SYSTEM AND METHOD FOR EVALUATING MAINTENANCE COSTS OF PRODUCTS

FIELD OF THE INVENTION

The present invention relates to data processing systems and methods for managing product financing and more specifically to a data processing system and method for evaluating maintenance costs of products.

BACKGROUND

Generally, products such as automobiles have been financed through a personal loan system, whereby the purchaser makes a down payment, takes title to the product and pays the loan balance in monthly payments which amortize the full amount of the loan. More recently, leasing arrangements have been introduced whereby the lessee makes monthly rental payments, returning the product to the lessor at the end of a predetermined term specified in the lease. Title to the product remains in the lessor. It is sometime specified in the lease that the lessee may at his option purchase the product for a stated value when the lease expires. The conditions of the lease may also include charges, e.g. a charge for abnormal mileage or wear and tear for lease of an automobile.

U.S. Pat. No. 4,736,294 discloses data processing methods and apparatus for managing vehicle financing. The data processing system provides information to assist in granting a loan, and determining at the time of making the loan a residual value of the vehicle at a predetermined option date.

Considering vehicle leases, at the signing of the lease, the lessee chooses a vehicle and states how many years he intends to keep it and the approximate mileage he intends to cover. Generally speaking, the lease duration is normally between 1 to 4 years while the number of miles varies from 20,000 to 60,000. Depending upon the vehicle and lease duration and mileage, the lessor determines monthly rental payments at the time of making the lease by estimating the resale value factor at the end of the lease, also referred to as the residual value factor, and costs due to the benefit margin, insurance and maintenance. Without taking into account the margin of the lessor, insurance, maintenance, etc., for sake of clarity, the sum of monthly rental payments corresponds to the difference between the sticker price, i.e. the purchasing price of the automobile as proposed by the manufacturer, and the resale price. If the resale price at the end of the lease is less than the estimation done at the time of making the lease, monthly rental payments have been underestimated and, as a consequence, the lessor loses money. Reciprocally, if the resale price at the end of the lease is more than the estimation done at the time of making the lease, monthly rental payments are overestimated, and thus the leases are not attractive. During the lease, the lessee may modify it to adapt its duration or mileage if the lessor agrees. In such a case, the residual value has to be reevaluated to adjust monthly rental payments accordingly.

In parallel with product loan, rental or purchase, maintenance agreements are often proposed. Such contracts are particularly suitable for leases since they reduce the lessee's care and provide a known and constant quality of service that increase residual value factor estimation accuracy. Thus, by adjusting the product value at the end of the lease, the lessor can purpose attractive leases without increasing commercial risks. By making a regular payment, e.g. a monthly payment, the lessee can effectively budget for the servicing and repair of the leased product since the lessor takes preventive and repair maintenance to his charge, e.g. overhauling of motor cars as advised by manufacturers.

Maintenance costs depend both on the product characteristics and maintenance agreement conditions, e.g. lease duration and mileage for vehicle leases. However, due to the general complexity of the products that are subjects of the maintenance agreements and the duration of the maintenance agreement, e.g. several years, the maintenance costs are difficult to model, and thus are generally evaluated approximately and experimentally by specialists.

SUMMARY

Thus, it is an object of the invention to provide a method to learn the maintenance cost behavior of products according to their characteristics and maintenance agreement conditions.

It is a further object of the invention to provide a method to evaluate accurately the maintenance costs of products according to their characteristics and maintenance agreement conditions.

The accomplishment of these and other related objects is achieved by a method of learning the behavior of the maintenance costs of products, using a learning database containing product characteristics, maintenance agreement conditions and maintenance costs associated therewith. The method comprises the steps of:

selecting at least one product characteristic from said learning database;

determining, from the learning database, first maintenance cost estimations associated with the modalities of the at least one product characteristic and building a first table storing modalities of the at least one product characteristic and the first maintenance cost estimations associated therewith;

selecting at least one maintenance agreement condition of said learning database; and, specifying values of the at least one maintenance agreement condition, determining maintenance cost correction coefficients associated with the specified values from the learning database and building a second table storing the specified values of the at least one maintenance agreement condition and the maintenance cost correction coefficients associated therewith;

wherein the first and second tables characterize the maintenance cost behavior of the products contained in the learning database.

The invention also includes a method to determine the maintenance cost of a product from its characteristics and maintenance agreement conditions, wherein a learning phase has been performed according to the previous method, comprising the steps of:

inputting the value of the product corresponding to the at least one product characteristic;

determining a first maintenance cost estimation from the first table;

inputting the value associated with the product, corresponding to the at least one maintenance agreement condition;

determining a maintenance cost correction coefficient from the second table; and, estimating the maintenance cost of the product by multiplying the first maintenance cost estimation by the maintenance cost correction coefficient.

Further advantages of the present invention will become apparent to those skilled in the art upon examination of the drawings and detailed description. It is intended that any additional advantages be incorporated herein.

BRIEF DESCRIPTION OF THE DRAWINGS

FIG. 7 comprising

DETAILED DESCRIPTION

The method of the invention comprises a learning phase and an application phase. During the learning phase, the system analyses initial data to determine the behavior of the maintenance costs regarding characteristics of the products and maintenance agreement conditions. This analysis performed on known data allows, during the application phase, evaluation of the maintenance costs of products that have not been used to train the system, e.g. leases for which real maintenance costs are unknown, or leases for which real maintenance costs are known and that are used to test system accuracy.

For sake of illustration, the following description is based on leases of vehicles. However, the method of the invention may be used for any kind of maintenance agreement for any kind of product. In the detailed example, the maintenance cost that must be evaluated is expressed in cents per mile. Using the global maintenance cost does not change the method of the invention.

Figures 1, 2:
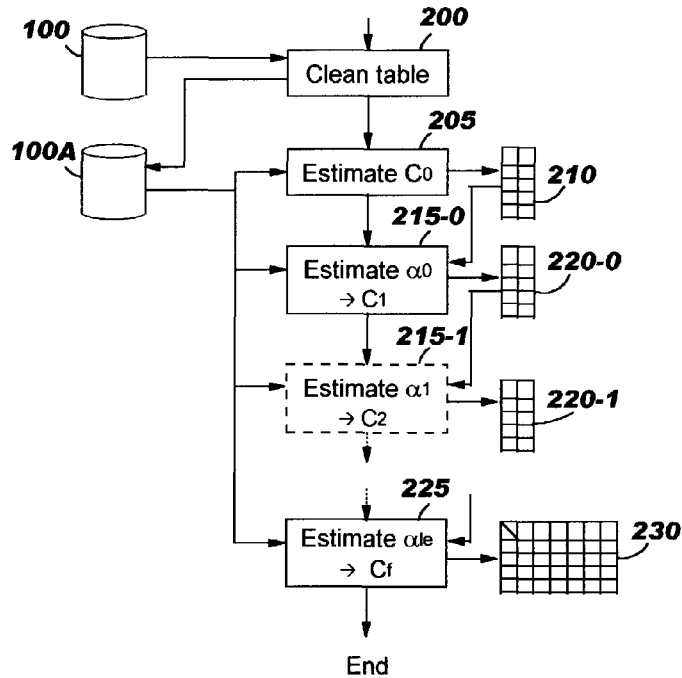
FIG. 1 shows the content of a typical table containing data used to train the system.
FIG. 2 depicts schematically the algorithm of the learning phase.

FIG. 1 shows an exemplary table 100 containing initial values of lease characteristics, which is used as a database to train the system during the learning phase. Preferably, these initial values of lease characteristics are actual values gathered from past leases. Each row, e.g. Row 150, contains the information relative to a particular lease. Columns 105 to 140 of table 100 contain information representing lease conditions and vehicle characteristics. Column 105 contains the identification of the vehicles, columns 110 and 115 contain lease mileage and duration respectively, columns 120 to 130 contain vehicle characteristics. Column 135 contains other characteristics of the vehicle, not represented for sake of clarity, such as option, color, tank capacity and kind of gearbox. Column 140 contains global vehicle maintenance cost, expressed in US dollars, that corresponds to the total maintenance expenses during the lease, and column 145 contains the maintenance cost of the leased vehicles expressed in cents per mile. Maintenance costs in cents per mile are determined at the end of the lease by dividing global maintenance costs by the mileage driven during the lease. It is important to note that the values represented in table 100 are hypothetical values given for sake of illustration and do not represent real values. Row 150 represents the information relative to the lease of vehicle identified by reference 13 425, which is a BMW. In this example, the lessee has covered 25,312 miles during a period of 1.73 years. The model and horsepower are 525i and 192 respectively. The global maintenance cost of this vehicle has been determined at the end of the lease, i.e. after 1.73 years and having covered 25,312 miles, and is equal to US$ 828.46. The maintenance cost expressed in cents per mile is equal to 3.273 cents per mile.

FIG. 2 illustrates schematically the learning phase algorithm that is used to determine maintenance cost behavior. Table 100 may contain aberrant records or statistical outliers that are preferably removed to improve system accuracy. To that end, a first optional step (step 200) is to analyze the data contained in learning table 100 to detect aberrant records using standard statistical techniques such as looking at the distribution of columns. Aberrant records are isolated so as to create table 100A that contains only relevant data that may be used for the training without perturbing the system.

Then, a first learning step includes selecting a first product characteristic or combination of characteristics, referred to as first variable, e.g. vehicle brand and model, and determining a first maintenance cost estimation C0 for each value that can be reached by this first variable, i.e. for each of its modalities. The result of this determination, based upon table 100A records, is stored in table 210, (step 205). In this example, each row of table 210 contains a particular vehicle brand/model and the corresponding first maintenance cost evaluation C0. Since the choice of product and maintenance agreement conditions often depends upon product use, maintenance agreement conditions may depend upon product characteristics. Thus, it may be desirable to take these conditions into account. To that end, first maintenance cost evaluation may be normalized so as not to depend upon maintenance agreement conditions. An example of normalization will be detailed by reference to FIG. 3.

Then, a second variable corresponding to another product characteristic or combination of characteristics may be selected and used to determine a correction coefficient $\alpha 0$ to improve maintenance cost estimation (step 215-0). Modalities of this second variable and associated correction coefficients $\alpha 0$ are memorized in table 220-0. Improved maintenance cost estimation C1 depends upon the first maintenance cost estimation C0 and the correction coefficient $\alpha 0$, and is obtained by multiplying C0 and $\alpha 0$. Likewise, a third or more variables may be selected to determine new correction coefficients $\alpha 1, \ldots, \alpha n$ to improve successively maintenance cost estimations C1, ..., (step 215-1, ... 215-n). Modalities of these variables and associated correction coefficients are memorized in table 220-1, ... 220-n. Finally, maintenance agreement conditions are used to determine a last correction coefficient $\alpha le$ to improve the last maintenance cost estimation (step 225). In this example, correction coefficient $\alpha le$ depends upon lease duration and mileage. Table 230 is used to memorized values of correction coefficient $\alpha le$ corresponding to specific lease duration/mileage pairs. The first, second, ..., variables are chosen by specialists of maintenance cost estimation of the considered products and/or experimentally.

Steps 205, 215-0 and 225 are detailed in the following description by reference to FIGS. 3, 4 and 5 respectively.

Figure 3A:
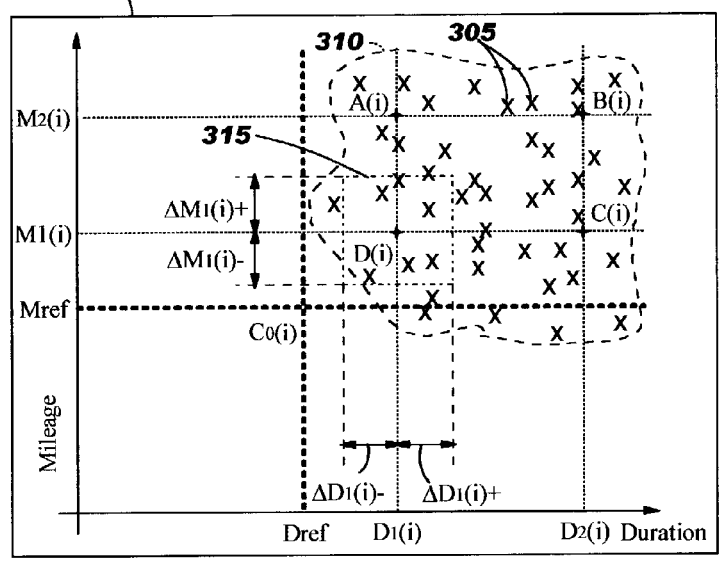
FIG. 3 comprising FIGS. 3a and 3b, describes the algorithm used to determine a first estimation of maintenance cost.
Figure 3B:
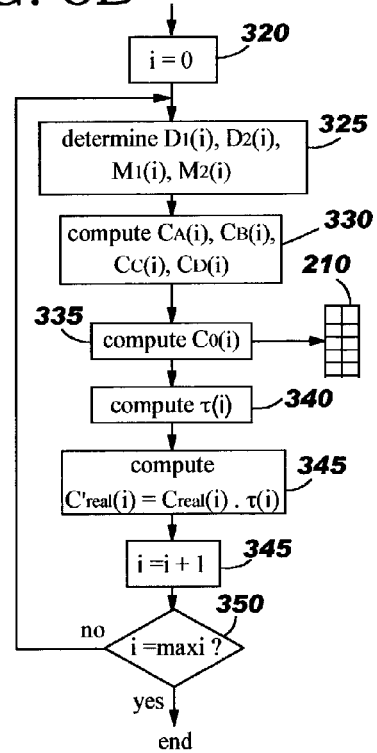

FIG. 3, comprising FIGS. 3a and 3b, illustrates the way of evaluating a first maintenance cost according to the first selected variable. FIG. 3a shows a 2-dimensional space referred to as 300 wherein abscissas and ordinates represent lease duration and mileage respectively. Points 305 represent all the records of table 100A having a common first variable modality as illustrated with set 310, e.g. all the Renault Clio of table 100A. As already mentioned, since the maintenance agreement conditions may depend upon product characteristics, it is important to determine maintenance cost and product characteristic pairs that are independent of the maintenance agreement conditions. To that end, Dref and Mref are defined by the user and correspond to reference duration and mileage, common for all records of table 100A while D1($i$), D2($i$), M1($i$) and M2($i$) are chosen so as to define A($i$), B($i$), C($i$) and D($i$) that are representative of set 310 of a particular modality $mod_1(i)$ of the first variable.

FIG. 3$b$ illustrates the algorithm used to compute a first maintenance cost estimation C0($i$) for each modality $mod_1(i)$ of the first variable. A first step consists in setting index i to zero (step 320). Index i characterizes the different modalities of the first variable, and maxi is the number of modalities. Then, values D1($i$), D2($i$), M1($i$) and M2($i$) are determined (step 325). In the described example, values D1($i$) and D2($i$) are determined so that 50% of the lease duration of the vehicles having common modality $mod_1(i)$ are included between D1($i$) and D2($i$), 25% are less than D1($i$) and 25% are greater than D2($i$). Values M1($i$) and M2($i$) are determined similarly. Maintenance cost estimations CA($i$), CB($i$), CC($i$) and CD($i$) of points A($i$), B($i$), C($i$), and D($i$) respectively are then computed (step 330). A window is defined around each of them to select points 305 that are used for this estimation. For example, considering point D($i$), window 315 is defined according to $\Delta D1(i)-$, $\Delta D1(i)+$, $\Delta M1(i)-$ and $\Delta M1(i)+$. These values may be constant, e.g. $\Delta D1(i)-=0.15$ years, or evaluated like D1($i$), D2($i$), M1($i$) and M2($i$) using statistical point distribution.

After having selected all the points 305 that are included in window 315, the median value of the maintenance cost as given in column 145 of FIG. 1 of these selected points is determined. This median value represents the maintenance cost estimation CD($i$) associated with the corresponding point D($i$). The same estimations CA($i$), CB($i$) and CC($i$) are done for the other points A($i$), B($i$) and C($i$) respectively. Then, a first estimation of the maintenance cost C0($i$) according to the common modality $mod_1(i)$ is computed according to the following equation (step 335):

$$C_0(i) = C_D(i) \cdot \frac{dxC(i)}{d(D(i), C(i))} \cdot \frac{dyA(i)}{d(D(i), A(i))} + \quad (1)$$
$$C_C(i) \cdot \frac{dxD(i)}{d(D(i), C(i))} \cdot \frac{dyA(i)}{d(D(i), A(i))} +$$
$$C_A(i) \cdot \frac{dxC(i)}{d(D(i), C(i))} \cdot \frac{dyD(i)}{d(D(i), A(i))} +$$
$$C_B(i) \cdot \frac{dxD(i)}{d(D(i), C(i))} \cdot \frac{dyD(i)}{d(D(i), A(i))}$$

where, dxM($i$) is the distance along the x axis between points (Dref, Mref) and M($i$), expressed in years;

dyM($i$) is the distance along the y axis between points (Dref, Mref) and M($i$), expressed in miles;

d(M($i$),N($i$)) is the distance between points M($i$) and N($i$), expressed in (years$^2$+miles$^2$)$^{1/2}$.

Maintenance cost C0($i$) is memorized in table 210. Then, translation parameter $\tau(i)$ is evaluated according to the following equation (step 340):

$$\tau(i) = \frac{4 \cdot C_0(i)}{C_A(i) + C_B(i) + C_C(i) + C_D(i)} \quad (2)$$

and a normalized maintenance cost C'real according to Dref and Mref is computed for each modality $mod_1(i)$ according to the following relation (step 345):

$$C'_{real}(i) = C_{real}(i) \cdot \tau(i) \quad (3)$$

where Creal($i$) is the real maintenance cost as given in column 145 of FIG. 1.

Index i is incremented by one (step 350) and a test is performed to detect whether or not index i has reached its maximum value maxi (step 355). If index i has not reached maxi, the last seven steps are repeated (steps 325 to 355), else, if i has reached maxi, the process is stopped.

When the algorithm described on FIG. 3$b$ stops, table 210 is completed, i.e. a first maintenance cost estimation has been assigned to each modality $mod_1(i)$ of the first variable.

Figure 4:
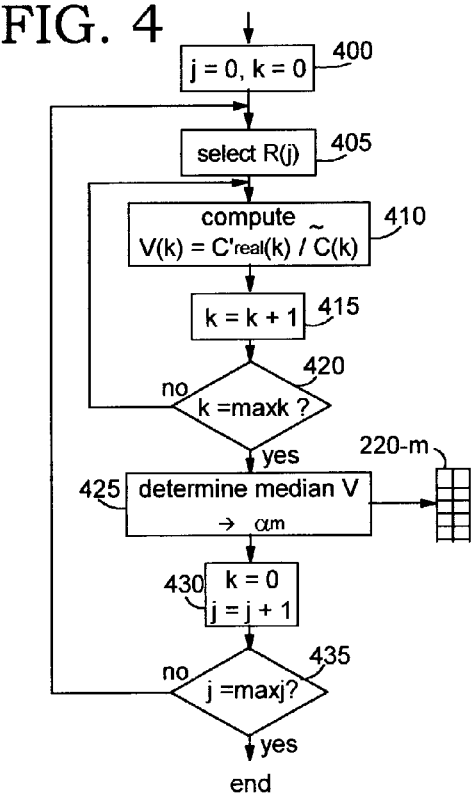
FIG. 4 illustrates the algorithm used to evaluate correction coefficients to improve the first estimation of the maintenance cost.

FIG. 4 represents the algorithm used to determine the maintenance cost correction coefficients α$i$. This algorithm corresponds to boxes referred to as 215-0 and 215-1 of FIG. 2. The first step (step 400) consists of initializing indexes j and k to zero. Index j corresponds to the modalities of the selected variable v, referred to as $mod_v(j)$ and index k corresponds to the records of table 100A corresponding to this modality $mod_v(j)$. Then, all the records of table 100A corresponding to the modality $mod_v(j)$ are selected (step 405) and V(k) is computed according to the following equation (step 410):

$$V(k) = \frac{C'_{real}(k)}{\tilde{C}(k)} \quad (3)$$

where $\tilde{C}(k)$ is the estimation of the maintenance cost for record k having modality $mod_v(j)$, for example:

during the estimation of α0: $\tilde{C}(k) = C_0(k)$ during the estimation of α1: $\tilde{C}(k) = C_1(k) = C_0(k) \cdot a_0(k)$ during the estimation of α2: $\tilde{C}(k) = C_2(k) = C_0(k) \cdot a_0(k) \cdot a_1(k)$ Then index k is incremented by one (step 415) and a test is performed to detect whether or not k has reached its maximum value maxk, i.e. whether v(k) has been computed for all the records of table 100A corresponding to modality $mod_v(j)$, (step 420). If k has not reached maxk, the last three steps (steps 410 to 420) are repeated; else, if k has reached maxk, the median value of V is evaluated (step 425) to determine the correction coefficient α$m$ corresponding to modality $mod_v(j)$.

The correction coefficient α$m$ is memorized in table 220-$m$ with its associated modality. For example, considering the second variable, correction coefficient α0 is memorized in table 220-0 with associated modality while considering a third variable, correction coefficient α1 is memorized in table 220-1 with its associated modality. Then, index k is set to zero, index j is incremented by one (step 430) and a test is performed to detect whether or not j has reached its maximum value maxj, i.e. whether all the modalities $mod_v$ have been analyzed, (step 435). If j has not reached maxj, the last seven steps (steps 405 to 435) are repeated; else, if j has reached maxj, the process is stopped. At the end of the process, a correction coefficient α$m$ has been assigned to each modality $mod_v$ of the selected variable and memorized in table 220-$m$ with associated modality.

Figure 5B:
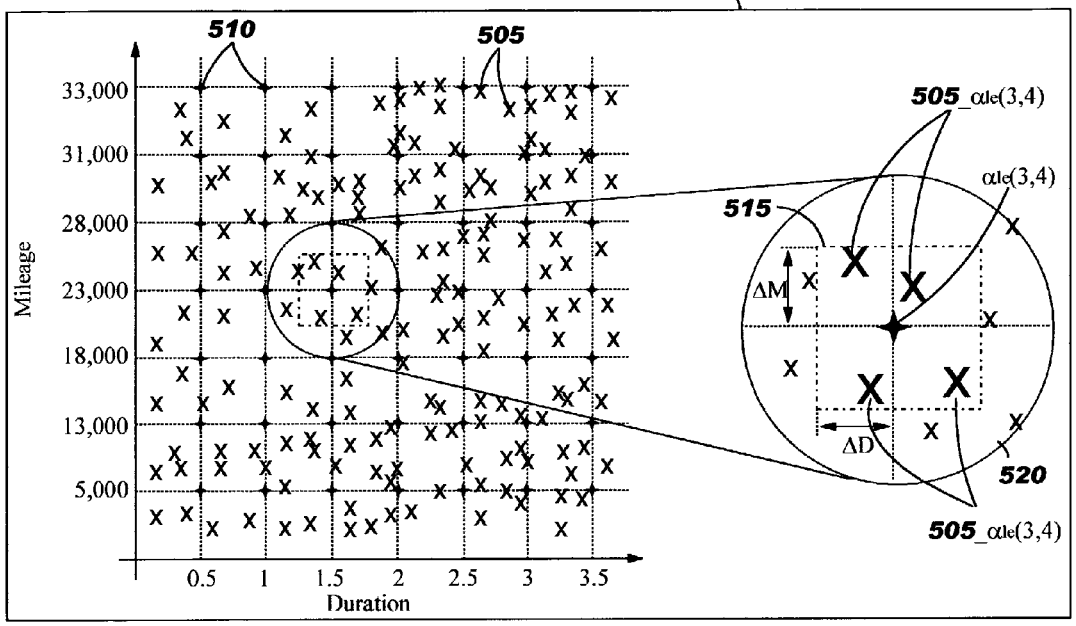
FIG. 5 comprising FIGS. 5a, 5b and 5c describes the algorithm used to determine a correction coefficient related to significant maintenance agreement conditions.
Figure 5C:
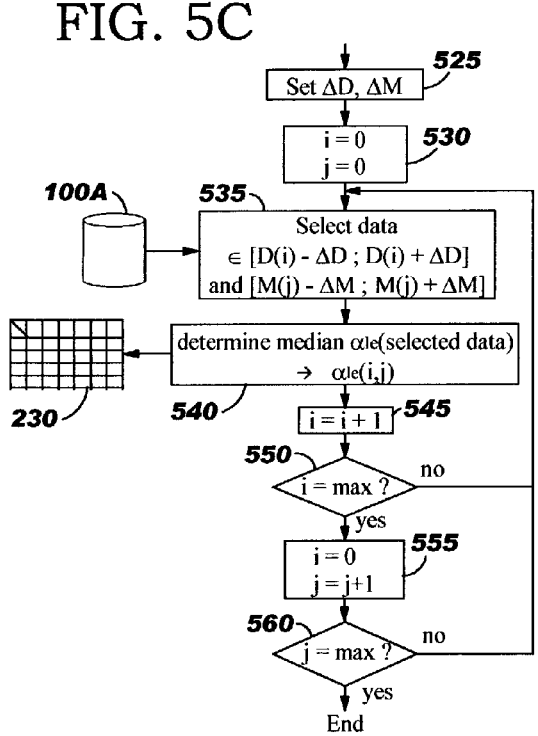
Figure 5A:
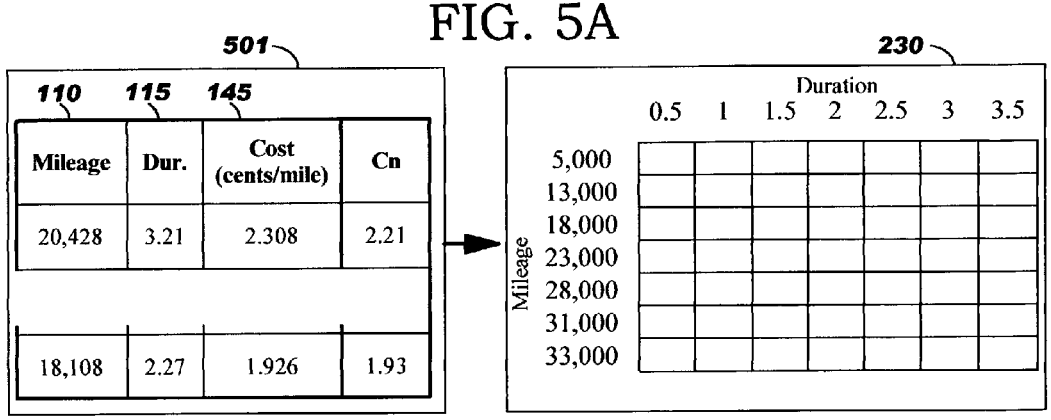

FIG. 5 illustrates the way of evaluating table 230 content as illustrated in box 225 of FIG. 2. FIG. 5$a$ shows a table 501 having columns 110, 115 and 145 of table 100A, containing the lease mileage, lease duration and real maintenance cost respectively, that are necessary for such evaluation, and the last maintenance cost estimation Cn, e.g. if two variables are used, n=1. As depicted on FIG. 5a, table 230 abscissas and ordinates represent lease duration and mileage respectively. Each cell of table 230 corresponds to a maintenance cost correction coefficient, referred to αle, of a significant lease duration/mileage pair. Table 230 row and column numbers, which may be different, depend upon the number of records contained in learning table 100A. These numbers are determined in such a way that the number of table cells is sufficient to reach required system accuracy and small enough so that a correction coefficient αle may be estimated for all the cells, using learning table 100A records. In practice, a number of 7 rows and columns gives good results. In this example, the lease duration and mileage values of table 230 columns and rows respectively are determined in such a way that the distribution of learning table 100A records is uniform regarding rows and columns, i.e. the number of records included between the values of 2 adjacent columns is constant and the number of records included between the values of 2 adjacent rows is also constant.

As an illustration, let us consider the following example: learning table 100A contains 100 records and table 230 has 3 columns and 3 rows that represent values $D_1$, $D_2$, $D_3$ and $M_1$, $M_2$, $M_3$ respectively. Thus, the values of $D_1$, $D_2$ and $D_3$ must be chosen so that the lease duration of 25 vehicles is included between $D_1$ and $D_2$ and 25 between $D_2$ and $D_3$. Likewise, the values of $M_1$, $M_2$ and $M_3$ are chosen so that the lease mileage of 25 vehicles is included between $M_1$ and $M_2$ and 25 between $M_2$ and $M_3$.

The correction coefficient αle of each table 230 cell is evaluated as illustrated in FIG. 5b that represents a 2-dimensional space referred to as 500 where abscissas and ordinates represent lease duration and mileage respectively. FIG. 5b has to be analyzed in conjunction with FIG. 5c that represents the algorithm used. Learning table 100A records are represented by marks referred to as 505 while the significant points to which the correction coefficients αle have to be evaluated, i.e. the points corresponding to table 230 cells, are referred to as 510. The correction coefficient αle of each point is extrapolated from the correction coefficient of its surrounding points that are included in a window 515 as illustrated in zoom 520. The correction coefficient of each record of table 100A is evaluated according to equation (3) wherein index k corresponds to the record that correction coefficient is under evaluation and $\tilde{C}(k)$ is the last maintenance cost evaluation. In the above mentioned example, the correction coefficient αle to be evaluated, referred to as αle(3,4), corresponds to a lease duration and mileage of 1.5 years and 23,000 miles respectively. Its coordinates on the represented grid are (3,4), which correspond to the third column and fourth row in table 230. Correction coefficients αle used for this evaluation are those associated with points referred to as 505_αle(3,4), localized in window 515. The size of window 515 is defined by ΔD and ΔM, which are parameters set by the user.

FIG. 5c illustrates the main steps of the algorithm used to evaluate table 230 cells. After ΔD and ΔM parameters are set to define the size of window 515 (step 525), i and j indexes representing both the indices of table 230 cells and points 510 are set to zero (step 530). Points 505 surrounding the one defined with indexes i and j that are included in window 515 are selected, e.g. points 505_αle(3,4), (step 535) and the median value of the correction coefficients associated with these selected points is evaluated and memorized in table 230 cell defined with indexes i and j (step 540). D(i) and M(j) represent the lease duration and mileage, respectively, of table 230 cell defined by indexes i and j. Index i is incremented (step 545) and a test is performed to detect whether or not index i has reached its maximum value, i.e. the number of table 230 columns (step 550). If index i has not reached its maximum value, the last four steps (steps 535 to 550) are repeated. If index i has reached its maximum value, it is set to zero and index j is incremented (step 555) and a test is performed to detect whether or not index j has reached its maximum value, i.e. the number of table 230 rows (step 560). If index j has not reached its maximum value, the last six steps (steps 535 to 560) are repeated. If index j has reached its maximum value, the process is stopped, i.e. the correction coefficient αle of each table 230 cell has been evaluated.

Figure 6:
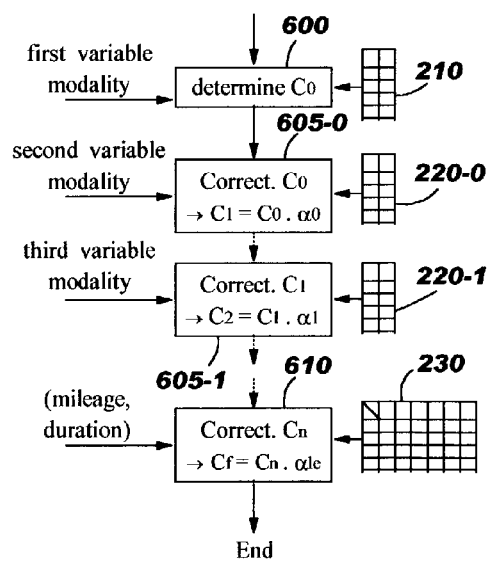
FIG. 6 illustrates the algorithm adapted to estimate the maintenance cost of a particular lease.

FIG. 6 illustrates the algorithm of the application phase, used to evaluate the maintenance cost of a product, at the time of making the maintenance agreement, when product characteristics and maintenance agreement conditions are known but the global maintenance cost is unknown. After having inputted modality of the first variable corresponding to a characteristic or a combination of characteristics of the product, a first maintenance cost estimation C0 is evaluated using table 210 (step 600). Then a first correction is done by selecting a first correction coefficient α0 in table 220-0 that corresponds to the modality of a second variable, still corresponding to a characteristic or a combination of characteristics of the product (step 605-0). This first correction is done by multiplying the first maintenance cost estimation by the first correction coefficient α0 to obtain a new maintenance cost estimation C1. The modality of a third or subsequent variable may be inputted to estimate other correction coefficients so as to improve maintenance cost estimation (steps 605-1, . . . ) using tables 220-1, and subsequent similar tables. Then, maintenance agreement conditions are used in conjunction with table 230 to compute correction coefficient αle (step 610). Evaluation of correction coefficient αle is illustrated by reference to FIG. 7. In the presented example concerning vehicle leases, relevant maintenance agreement conditions that are used to determine correction coefficient αle are lease duration and mileage. At the end of the process described on FIG. 6, final maintenance cost estimation is equal to:

$$C_f = C_0 \cdot al_e \cdot \prod_{m=0}^{n} a_m \quad (4)$$

Figure 7A:
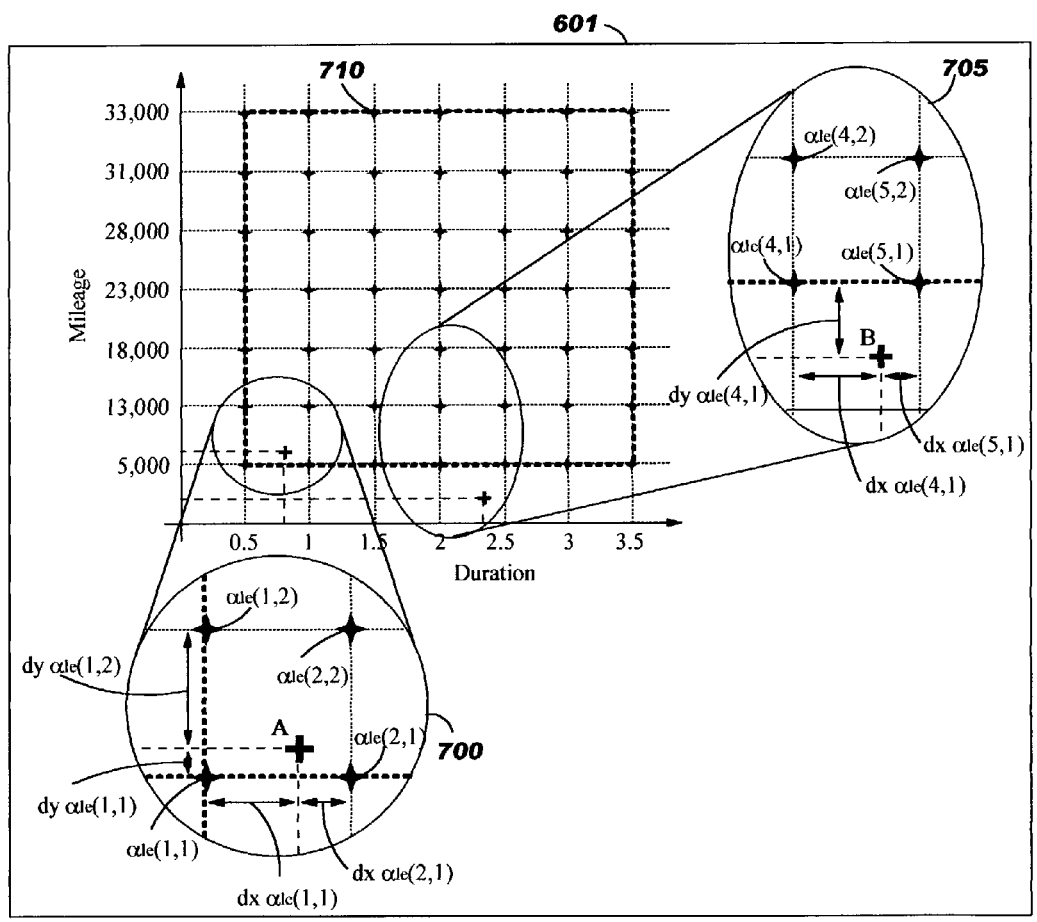
FIGS. 7a and 7b shows the algorithm used to evaluate a correction coefficient related to lease duration and mileage.
Figure 7B:
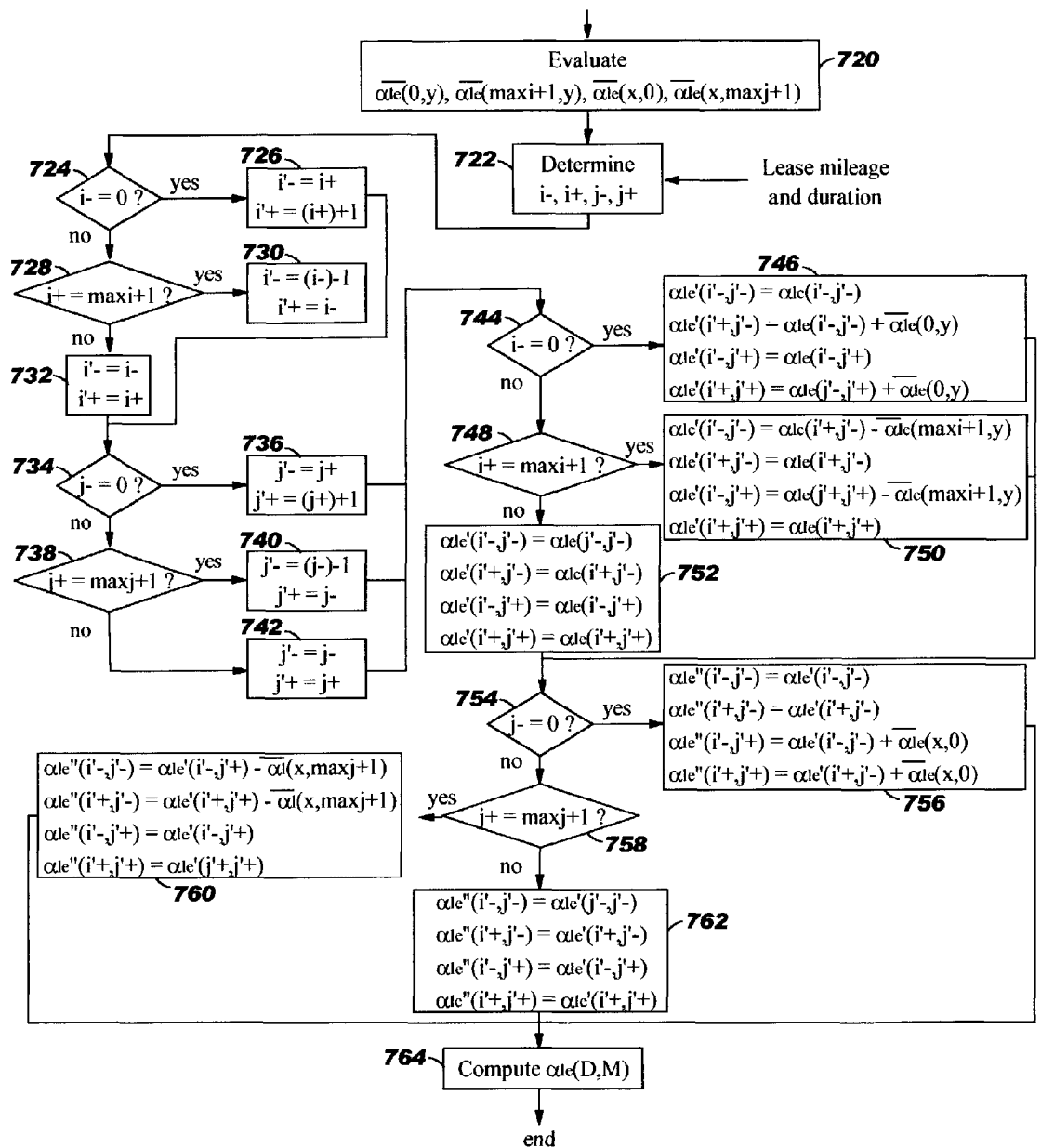

FIG. 7 illustrates the use of table 230 represented by box 610 of FIG. 6 to extrapolate correction coefficients αle according to lease duration and mileage pairs. FIG. 7a, representing 2-D space 601 in which table 100A records have been suppressed since they are not used during the application phase, shows two examples of correction coefficient αle evaluations in zooms 700 and 705. FIG. 7b describes the algorithm used for such extrapolation. Step 720 consists of computing constant values $\overline{a_{le}}(0,y)$, $\overline{a_{le}}(\max i+1,y)$, $\overline{a_{le}}(x,0)$ and $\overline{a_{le}}$ according to the following equations:

$$\overline{a_{le}}(0, y) = \frac{\sum_{k=1}^{\max j} (a_{le}(2, k) - a_{le}(1, k))}{\max j} \quad (5)$$

-continued $$\overline{a_{le}}(\text{max}i+1, y) = \frac{\sum_{k=1}^{\text{max}j}(a_{le}(\text{max}i, k) - a_{le}(\text{max}i-1, k))}{\text{max}j} \quad (6)$$

$$\overline{a_{le}}(x, O) = \frac{\sum_{k=1}^{\text{max}i}(a_{le}(k, 2) - a_{le}(k, 1))}{\text{max}i} \quad (7)$$

$$\overline{a_{le}}(x, \text{max}j+1) = \frac{\sum_{k=1}^{\text{max}i}(a_{le}(k, \text{max}j) - a_{le}(k, \text{max}j-1))}{\text{max}i} \quad (8)$$

where maxi and maxj are the number of table 230 columns and rows respectively. It is to be noted that step 720 needs to be executed only once. After the lease duration (D) and mileage (M) have been inputted, variables i−, i+, j− and j+ are evaluated (step 722). Variable i− corresponds to the maximum table 230 abscissa that corresponds to the greatest table 230 lease duration that is less than the input lease duration, i+ corresponds to the minimum table 230 abscissa that corresponds to the least table 230 lease duration that is greater than the inputted lease duration, j− corresponds to the maximum table 230 ordinate that corresponds to the greatest table 230 lease mileage that is less than the inputted lease mileage, and j+ corresponds to the minimum table 230 ordinate that corresponds to the least table 230 lease mileage that is greater than inputted lease mileage. For example, considering point B on FIG. 7a, (i−)=4, (i+)=5, (j−)=0 and (j+)=1.

A first test is performed to detect whether or not i− is equal to zero (step 724). If i− is equal to zero, i'− and i'+ indexes are set to i+ and (i+)+1 respectively (step 726). If i− is not equal to zero, a second test is performed to detect whether or not i+ is equal to maxi+1 (step 728). If i+ is equal to maxi+1, i'− and i'+, indexes are set to (i−)−1 and i− respectively (step 730); else if i− is not equal to zero and i+ is not equal to maxi+1, i'− and i'+ indexes are set to i− and i+ respectively (step 732). Then, a test is performed to detect if j− is equal to zero or not (step 734). If j− is equal to zero, j'− and j'+ indexes are set to j+ and (j+)+1 respectively (step 736). If j− is not equal to zero another test is performed to detect whether or not j+ is equal to maxj+1 (step 738). If j+ is equal to maxj+1, j'− and j'+ indexes are set to (j−)−1 and j− respectively (step 740). If j− is not equal to zero and j+ is not equal to maxj+1, j'− and j'+ indexes are set to j− and j+ respectively (step 742). At the end of steps 724 to 742, a value has been assigned to i'−, i'+, j'− and j'+ indexes whatever the value of i−, i+, j− and j+ is. For example considering points A and B as shown on FIG. 7a, A: i−=1, i+=2, j−=1, j+=2 ➔ i'−=1, i'+=2, j'−=1, j'+=2

B: i−=4, i+=5, j−=0, j+=1 ➔ i'−=4, i'+=5, j'−=1, j'+=2

Then, tests corresponding to steps 724, 728, 734 and 738 are performed again and provisional correction coefficient αle are estimated.

If i− is equal to zero (step 744), provisional correction coefficients αle'(i'−, j'−), αle'(i'+, j'−), αle'(i'−, j'+) and αle' (i'+, j'+) are estimated according to the following equations (step 746):

$$a'_{le}(i'-,j'-)=a_{le}(i'-,j'-) \quad (9\text{-}1)$$

$$a'_{le}(i'+,j'-)=a_{le}(i'-,j'-)+\overline{a_{le}}(0,y) \quad (10\text{-}1)$$

$$a'_{le}(i'-,j'+)=a_{le}(i'-,j'+) \quad (11\text{-}1)$$

$$a'_{le}(i'+,j'+)=a_{le}(i'-,j'+)+\overline{a_{le}}(0,y) \quad (12\text{-}1)$$

where αle(D,M) is the correction coefficient of the lease duration D and mileage M.

If i+ is equal to maxi+1 (step 748), provisional correction coefficients αle'(i'−, j'−), αle'(i'+, j'−), αle'(i'−, j'+) and αle' (i'+, j'+) are estimated according to the following equations (step 750):

$$a'_{le}(i'-,j'-)=a_{le}(i'+,j'-)-\overline{a_{le}}(\text{max }i+1, y) \quad (9\text{-}2)$$

$$a'_{le}(i'+,j'-)=a_{le}(i'+,j'-) \quad (10\text{-}2)$$

$$a'_{le}(i'-,j'+)=a_{le}(i'+,j'+)-\overline{a_{le}}(\text{max }i+1, y) \quad (11\text{-}2)$$

$$a'_{le}(i'+,j'+)=a_{le}(i'+,j'+) \quad (12\text{-}2)$$

If i− is not equal to zero and i+ is not equal to maxi+1, provisional correction coefficients αle'(i'−,j'−), αle'(i'+,j'−), αle'(i'−, j'+) and αle'(i'+, j'+) are estimated according to the following equations (step 752):

$$a'_{le}(i'-,j'-)=a_{le}(i'-,j'-) \quad (9\text{-}3)$$

$$a'_{le}(i'+,j'-)=a_{le}(i'+,j'-) \quad (10\text{-}3)$$

$$a'_{le}(i'-,j'+)=a_{le}(i'-,j'+) \quad (11\text{-}3)$$

$$a'_{le}(i'+,j'+)=a_{le}(i'+,j'+) \quad (12\text{-}3)$$

If j− is equal to zero (step 754), provisional correction coefficients αle''(i'−,j'−), αle''(i'+,j'−), αle''(i'−,j'+) and αle'' (i'+,j'+) are estimated according to the following equations (step 756):

$$a''_{le}(i'-,j'-)=a'_{le}(i'-,j'-) \quad (13\text{-}1)$$

$$a''_{le}(i'+,j'-)=a'_{le}(i'+,j'-) \quad (14\text{-}1)$$

$$a''_{le}(i'-,j'+)=a'_{le}(i'-,j'-)+\overline{a_{le}}(x, 0) \quad (15\text{-}1)$$

$$a''_{le}(i'+,j'+)=a'_{le}(i'+,j'-)+\overline{a_{le}}(x, 0) \quad (16\text{-}1)$$

If j+ is equal to maxj+1 (step 758), provisional correction coefficients αle''(i'−,j'−), αle''(i'+,j'−), αle''(i'−,j'+) and αle'' (i'+,j'+) are estimated according to the following equations (step 760):

$$a''_{le}(i'-,j'-)=a'_{le}(i'-,j'+)-\overline{a_{le}}(x, \text{max }j+1) \quad (13\text{-}2)$$

$$a''_{le}(i'+,j'-)=a'_{le}(i'+,j'+)-\overline{a_{le}}(x, \text{max }j+1) \quad (14\text{-}2)$$

$$a''_{le}(i'-,j'+)=a'_{le}(i'-,j'+) \quad (15\text{-}2)$$

$$a''_{le}(i'+,j'+)=a'_{le}(i'+,j'+) \quad (16\text{-}2)$$

If j− is not equal to zero and j+ is not equal to maxj+1, provisional correction coefficient αle''(i'−,j'−), αle''(i'+,j'−), αle''(i'−,j'+) and αle''(i'+,j'+) are estimated according to the following equations (step 762):

$$a''_{le}(i'-,j'-)=a'_{le}(i'-,j'-) \quad (13\text{-}3)$$

$$a''_{le}(i'+,j'-)=a'_{le}(i'+,j'-) \quad (14\text{-}3)$$

$$a''_{le}(i'-,j'+)=a'_{le}(i'-,j'+) \quad (15\text{-}3)$$

$$a''_{le}(i'+,j'+)=a'_{le}(i'+,j'+) \quad (16\text{-}3)$$

Then, residual value factor is computed according to the following equation (step 764):

$$a_{le}(D, M) = a''_{le}(i'-, j'-) \cdot \frac{dxa_{le}(i'+, j'-)}{d(a_{le}(i'-, j'-), a_{le}(i'+, j'-))} \cdot \quad (17)$$

$$\frac{dya_{le}(i'-, j'+)}{d(a_{le}(i'-, j'-), a_{le}(i'-, j'+))} +$$

$$a''_{le}(i'+, j'-) \cdot \frac{dxa_{le}(i'-, j'-)}{d(a_{le}(i'-, j'-), a_{le}(i'+, j'-))} \cdot$$

$$\frac{dya_{le}(i'-, j'+)}{d(a_{le}(i'-, j'-), a_{le}(i'-, j'+))} +$$

$$a''_{le}(i'-, j'+) \cdot \frac{dxa_{le}(i'+, j'-)}{d(a_{le}(i'-, j'-), a_{le}(i'+, j'-))} \cdot$$

$$\frac{dya_{le}(i'-, j'-)}{d(a_{le}(i'-, j'-), a_{le}(i'-, j'+))} +$$

$$a''_{le}(i'+, j'+) \cdot \frac{dxa_{le}(i'-, j'-)}{d(a_{le}(i'-, j'-), a_{le}(i'+, j'-))} \cdot$$

$$\frac{dya_{le}(i'-, j'-)}{d(a_{le}(i'-, j'-), a_{le}(i'-, j'+))}$$

where, dxα1e(i,j) is the signed distance along the x axis between the point that the correction coefficient is being evaluated and the point (i,j), expressed in years;

dyα1e(i,j) is the signed distance along the y axis between the point that the correction coefficient is being evaluated and the point (i,j), expressed in miles; and d(αle(i,j), αle(k,l)) is the distance between points (i,j) and (k,l), expressed in (years$^2$+miles$^2$)$^{1/2}$.

For example, considering point A and B as shown on FIG. 7a, the correction coefficient αle is:

$$a_{le}(A) = a''_{le}(1, 1) \cdot \frac{dxa_{le}(2, 1)}{d(a_{le}(1, 1), a_{le}(2, 1))} \cdot \frac{dya_{le}(1, 2)}{d(a_{le}(1, 1), a_{le}(1, 2))} +$$

$$a''_{le}(2, 1) \cdot \frac{dxa_{le}(1, 1)}{d(a_{le}(1, 1), a_{le}(2, 1))} \cdot \frac{dya_{le}(1, 2)}{d(a_{le}(1, 1), a_{le}(1, 2))} +$$

$$a''_{le}(1, 2) \cdot \frac{dxa_{le}(2, 1)}{d(a_{le}(1, 1), a_{le}(2, 1))} \cdot \frac{dya_{le}(1, 1)}{d(a_{le}(1, 1), a_{le}(1, 2))} +$$

$$a''_{le}(2, 2) \cdot \frac{dxa_{le}(1, 1)}{d(a_{le}(1, 1), a_{le}(2, 1))} \cdot \frac{dya_{le}(1, 1)}{d(a_{le}(1, 1), a_{le}(1, 2))}$$

with, $a''_{le}(1, 1) = a_{le}(1, 1)$ $a''_{le}(2, 1) = a_{le}(2, 1)$ $a''_{le}(1, 2) = a_{le}(1, 2)$ $a''_{le}(2, 2) = a_{le}(2, 2)$ $$a_{le}(B) = a''_{le}(4, 1) \cdot \frac{dxa_{le}(5, 1)}{d(a_{le}(4, 1), a_{le}(5, 1))} \cdot \frac{dya_{le}(4, 2)}{d(a_{le}(4, 1), a_{le}(4, 2))} +$$

$$a''_{le}(5, 1) \cdot \frac{dxa_{le}(4, 1)}{d(a_{le}(4, 1), a_{le}(5, 1))} \cdot \frac{dya_{le}(4, 2)}{d(a_{le}(4, 1), a_{le}(4, 2))} +$$

$$a''_{le}(4, 2) \cdot \frac{dxa_{le}(5, 1)}{d(a_{le}(4, 1), a_{le}(5, 1))} \cdot \frac{dya_{le}(4, 1)}{d(a_{le}(4, 1), a_{le}(4, 2))} +$$

$$a''_{le}(5, 2) \cdot \frac{dxa_{le}(4, 1)}{d(a_{le}(4, 1), a_{le}(5, 1))} \cdot \frac{dya_{le}(4, 1)}{d(a_{le}(4, 1), a_{le}(4, 2))}$$

with, $a''_{le}(4, 1) = a_{le}(4, 1)$ $a''_{le}(5, 1) = a_{le}(5, 1)$ $a''_{le}(4, 2) = a_{le}(4, 1) + \overline{a_{le}}(x, 0)$ $a''_{le}(5, 2) = a_{le}(5, 1) + \overline{a_{le}}(x, 0)$ While the invention has been described in term of preferred embodiments, those skilled in the art will recognize that the invention can be practiced differently without departing from the spirit and scope of the invention as defined by the appended claims. In particular, vehicles may be classified according to criteria such as their category or utilization type, e.g. Touring/LCVs/gasoline/diesel, in order to create as many tables 210, 220-i and 230 as vehicle classes to improve system accuracy. In such cases, one learning phase is performed per class. Likewise, 2-dimensional table 230 may be replaced by an n-dimensional table (n being an integer) and the learning database 100 may be replaced by several learning databases, e.g. the first one being used to create tables 210 and 220-i, i.e. first learning step, and the second one being used to determine relevant maintenance agreement conditions and the associated correction coefficients, i.e. second learning step.

The invention claimed is:

1. A method for use in a data processing system to learn behavior of maintenance costs of products and determine maintenance costs of products, using a learning database containing product characteristics, maintenance agreement conditions and actual historical maintenance costs associated therewith, comprising the steps of:

receiving by the data processing system a selection of at least one product characteristic stored in said learning database;

determining by the data processing system, from said actual historical maintenance costs in the learning database, first maintenance cost estimations $C_0(i)$ associated with each modality i of said at least one product characteristic and building a first table storing the modalities and said first maintenance cost estimations associated therewith according to the equation $$C_0(i) = C_D(i) \frac{dxC(i)}{d[D(i), C(i)]} \frac{dyA(i)}{d[D(i), A(i)]} + C_C(i) \frac{dxD(i)}{d[D(i), C(i)]} \frac{dyA(i)}{d[D(i), A(i)]} +$$

$$C_A(i) \frac{dxC(i)}{d[D(i), C(i)]} \frac{dyD(i)}{d[D(i), A(i)]} + C_B(i) \frac{dxD(i)}{d[D(i), C(i)]} \frac{dyD(i)}{d[D(i), A(i)]}$$

wherein dxM(i) is the distance along the x axis between points (Dref, Mref) and M(i), expressed in years, and M(i) is C(i) or D(i);

dyM(i) is the distance along the y axis between points (Dref, Mref) and M(i), expressed in miles, and M(i) is C(i) or D(i);

d(M(i),N(i)) is the distance between points M(i) and N(i), expressed in (years$^2$ miles$^2$)$^{1/2}$:

Dref and Mref are defined by the user and correspond to reference duration and mileage;

A(i), B(i), C(i), and D(i) are representative values of the duration and mileage of the selection of the at least one product characteristic;

$C_A(i)$, $C_B(i)$, $C_C(i)$, and $C_D(i)$ are maintenance costs estimates computed on the basis of A(i), B(i), C(i), and D(i);

receiving by the data processing system a selection of at least one maintenance agreement condition of said learning database;

specifying by the data processing system values of said at least one maintenance agreement condition, determining maintenance cost correction coefficients associated with said specified values and building a second table storing said specified values and said maintenance cost correction coefficients associated therewith, the maintenance cost correction coefficients being determined based upon actual historical maintenance costs for lease durations and mileages within a user defined window surrounding the specified values, the user defined window being selected to include a user specified window allocation distribution of actual historical maintenance costs associated with the modality i of the at least one product characteristic in an interval of duration between $C(i)$ and $D(i)$, and in an interval of miles between $A(i)$ and $D(i)$; and estimating by the data processing system a maintenance cost of said product by multiplying a maintenance cost estimation from the first table by a maintenance cost correction coefficient from the second table;

wherein said first and second tables characterize maintenance cost behavior of products contained in said learning database.

2. The method of claim 1 wherein said step of determining first maintenance cost estimations comprises the step of normalizing said first maintenance cost estimations according to the at least one maintenance agreement condition.

3. The method of claim 1, further comprising the steps of:
selecting at least one other product characteristic from said learning database; and,
determining, from said learning database, other maintenance cost correction coefficients associated with modalities of said at least one other product characteristic and building at least one other table storing the modalities of said at least one other product characteristic and said other maintenance cost correction coefficients associated therewith.

4. The method of claim 1, wherein said specified values of said second table are determined so that records of said learning database are uniformly distributed in said second table.

5. The method of claim 1, wherein the steps of determining maintenance cost correction coefficients and building a second table further comprise the steps of:
setting a window value for each of said at least one maintenance agreement condition:
for each of said specified values of said at least one maintenance agreement condition:
storing said specified value in said second table;
selecting records of said learning database whose values corresponding to said at least one maintenance agreement condition belong to a range defined by said specified value and said window value;
extrapolating a maintenance cost correction coefficient from the maintenance cost correction coefficients associated with said selected records; and
storing said extrapolated maintenance cost correction coefficient in said second table in association with said specified value.

6. The method of claim 5 wherein said extrapolated maintenance cost correction coefficient is a median value of the maintenance cost correction coefficients associated with said selected records.

7. The method of claim 1, further comprising a step of analyzing said learning database to detect aberrant records and isolating said aberrant records from said learning database.

8. The method of claim 1, further comprising the steps of:
inputting a value of a product corresponding to said at least one product characteristic;
determining a first maintenance cost estimation from said first table;
inputting a value, associated with the product, corresponding to said at least one maintenance agreement condition; and
determining the maintenance cost correction coefficient from said second table.

9. The method of claim 8, wherein said step of determining a maintenance cost correction coefficient from said second table, comprises the steps of:
selecting specified values of said second table bordering said product value corresponding to said at least one maintenance agreement condition; and,
extrapolating said maintenance cost correction coefficient from the maintenance cost correction coefficients associated with said selected specified values.

10. The method of claim 9 wherein said extrapolation is a linear extrapolation.

11. The method of claim 8 wherein said step of determining a maintenance cost correction coefficient from said second table, comprises the steps of:
comparing said product value corresponding to said at least one maintenance agreement condition with said specified values of said second table; and
when said product value corresponding to said at least one maintenance agreement condition is bordered by specified values of the second table, determining said maintenance cost correction coefficient by performing a linear extrapolation on the maintenance cost correction coefficients associated with specified values of said second table bordering said product value.

12. The method of claim 8 further comprising the steps of:
inputting a product value corresponding to said at least one other product characteristic; and,
determining at least one other maintenance cost correction coefficient from said at least one other table;
wherein the maintenance cost estimation is equal to said first maintenance cost estimation multiplied by said maintenance cost correction coefficient and said at least one other maintenance cost correction coefficient.

13. The method of claim 1, wherein said at least one maintenance agreement condition comprises lease duration.

14. The method of claim 1, wherein said products are vehicles.

15. A computerized data processing system for determining maintenance costs of products, comprising:
the data processing system having a storage system that stores a learning database comprising product characteristics, maintenance agreement conditions and associated historical maintenance costs;
the data processing system having an input system enabling selecting of at least one product characteristic and at least one maintenance agreement condition from the learning database;
the data processing system having a processor programmed to determine, from the learning database, first maintenance cost estimations $C_0(i)$ associated with modalities i of the at least one product characteristic according to the equation $$C_0(i) = $$
$$C_D(i)\frac{dxC(i)}{d[D(i), C(i)]}\frac{dyA(i)}{d[D(i), A(i)]} + C_C(i)\frac{dxD(i)}{d[D(i), C(i)]}\frac{dyA(i)}{d[D(i), A(i)]} +$$
$$C_A(i)\frac{dxC(i)}{d[D(i), C(i)]}\frac{dyD(i)}{d[D(i), A(i)]} + C_B(i)\frac{dxD(i)}{d[D(i), C(i)]}\frac{dyD(i)}{d[D(i), A(i)]}$$

wherein dxM(i) is the distance along the x axis between points (Dref, Mref) and M(i), expressed in years, and M(i) is C(i) or D(i);

dyM(i) is the distance along the y axis between points (Dref, Mref) and M(i), expressed in miles, and M(i) is A(i) or D(i);

d(M(i),N(i)) is the distance between points M(i) and N(i), expressed in (years$^2$ miles$^2$)$^{1/2}$;

Dref and Mref are defined by the user and correspond 10 reference duration and mileage;

A(i), B(i), C(i), and D(i) are representative of the duration and mileage of the selection of the at least one product characteristic;

$C_A(i)$, $C_B(i)$, $C_C(i)$, and $C_D(i)$ are maintenance costs estimates computed on the basis of A(i), B(i), C(i), and D(i);

the data processing system configured to build a first table storing the modalities and the associated first maintenance cost estimations; and the data processing system configured also to determine maintenance cost correction coefficients associated with specified values and to build a second table storing the specified values and the associated maintenance cost correction coefficients, the maintenance cost correction coefficients being determined based upon actual historical maintenance costs for lease durations and mileages within a user defined window surrounding the specified values, the user defined window being selected to include a user specified window allocation distribution of actual historical maintenance costs associated with the modality i of the at least one product characteristic in an interval of duration between C(i) and D(i), and in an interval of miles between A(i) and D(i), the data processing system configured to estimate a maintenance cost of the product by multiplying a first maintenance cost estimation from the first table by a maintenance cost correction coefficient from the second table; and a display that displays the estimated maintenance cost of the product;

wherein said first and second tables characterize maintenance cost behavior of products contained in the learning database.

16. A program storage device readable by a data processing system, tangibly embodying a program of instructions executable by the data processing system to determine maintenance costs of products from a learning database comprising product characteristics, maintenance agreement conditions and associated historical maintenance costs, comprising:

a product characteristic code section that receives a selection of at least one product characteristic stored in the learning database;

a first table code section that determines, from the historical maintenance costs of the learning database, first maintenance cost estimations $C_0(i)$ associated with modalities i of the at least one product characteristic according to the equation $$C_0(i) =$$
$$C_D(i)\frac{dxC(i)}{d[D(i), C(i)]}\frac{dyA(i)}{d[D(i), A(i)]} + C_C(i)\frac{dxD(i)}{d[D(i), C(i)]}\frac{dyA(i)}{d[D(i), A(i)]} +$$
$$C_A(i)\frac{dxC(i)}{d[D(i), C(i)]}\frac{dyD(i)}{d[D(i), A(i)]} + C_B(i)\frac{dxD(i)}{d[D(i), C(i)]}\frac{dyD(i)}{d[D(i), A(i)]}$$

wherein dxM(i) is the distance along the x axis between points (Dref, Mref) and M(i), expressed in years, and M(i) is C(i) or D(i);

dyM(i) is the distance along the y axis between points (Dref, Mref) and M(i), expressed in miles, and M(i) is A(i) or D(i);

d(M(i),N(i)) is the distance between points M(i) and N(i), expressed in (years$^2$+miles$^2$)$^{1/2}$;

Dref and Mref are defined by the user and correspond to reference duration and mileage;

A(i), B(i), C(i), and D(i) are representative of the duration and mileage of the selection of the at least one product characteristic;

$C_A(i)$, $C_B(i)$, $C_C(i)$, and $C_D(i)$ are maintenance costs estimates computed on the basis A(i), B(i), C(i), and D(i):

and builds a first table storing the modalities and the associated first maintenance cost estimations;

a maintenance agreement condition code section that receives a selection of at least one maintenance agreement condition of the learning database;

a second table code section that specifies values of the at least one maintenance agreement condition, determines maintenance cost correction coefficients associated with the specified values and builds a second table storing the specified values and the associated maintenance cost correction coefficients, the maintenance cost correction coefficients being determined based upon actual historical maintenance costs for lease durations and mileages within a user defined window surrounding the specified values, the user defined window being selected to include a user specified window allocation distribution of actual historical maintenance costs associated with the modality i of the at least one product characteristic in an interval of duration between C(i) and D(i), and in an interval of miles between A(i) and D(i); and an estimating code section that estimates a maintenance cost of the product by multiplying a first maintenance cost estimation from the first table by a maintenance cost correction coefficient from the second table;

wherein said first and second tables characterize maintenance cost behavior of products contained in the learning database.

* * * * *